(12) United States Patent
Bishop, III et al.

(10) Patent No.: US 11,874,931 B2
(45) Date of Patent: Jan. 16, 2024

(54) ELECTRONIC SYSTEM FOR IDENTIFYING FAULTY CODE AND VULNERABILITIES IN SOFTWARE PROGRAMS USING LINKED EVALUATION TOOLS

(71) Applicant: BANK OF AMERICA CORPORATION, Charlotte, NC (US)

(72) Inventors: Jack Lawson Bishop, III, Evanston, IL (US); Timothy Andrew Wright, Bracknell (GB); Robert Riley Zink, Chicago, IL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 562 days.

(21) Appl. No.: 17/173,547

(22) Filed: Feb. 11, 2021

(65) Prior Publication Data

US 2022/0253532 A1 Aug. 11, 2022

(51) Int. Cl.
*G06F 21/57* (2013.01)
*G06F 11/36* (2006.01)
*G06N 20/00* (2019.01)

(52) U.S. Cl.
CPC ........ *G06F 21/577* (2013.01); *G06F 11/3684* (2013.01); *G06F 11/3688* (2013.01); *G06F 11/3692* (2013.01); *G06N 20/00* (2019.01); *G06F 2221/033* (2013.01)

(58) Field of Classification Search
CPC .. G06F 21/566; G06F 21/577; G06F 11/3684; G06F 11/3688; G06F 11/3692; G06F 2221/033
See application file for complete search history.

(56) References Cited

U.S. PATENT DOCUMENTS

| | | | |
|---|---|---|---|
| 11,593,475 B2* | 2/2023 | Kawakita | G06Q 50/10 |
| 2012/0198280 A1* | 8/2012 | Cao | G06F 11/3684 |
| | | | 714/E11.178 |
| 2013/0185056 A1* | 7/2013 | Ingram | G06F 11/3684 |
| | | | 704/9 |
| 2014/0331327 A1* | 11/2014 | Maor | C07K 14/47 |
| | | | 726/25 |
| 2015/0309813 A1* | 10/2015 | Patel | G06F 21/577 |
| | | | 703/22 |
| 2018/0349602 A1* | 12/2018 | Johns | G06F 21/552 |
| 2019/0196950 A1* | 6/2019 | Ranganathan | G06F 8/10 |
| 2019/0213115 A1* | 7/2019 | Takawale | G06F 11/3692 |

(Continued)

*Primary Examiner* — Eric W Shepperd
(74) *Attorney, Agent, or Firm* — Moore & Van Allen PLLC; R. W. McCord Rayburn

(57) ABSTRACT

Systems, computer program products, and methods are described herein for dynamically generating linked security tests. The present invention may be configured to perform security tests on an application, generate, based on the results of the security tests, security test sequences that include at least one security test that the application failed, perform the security test sequences on the application, and, iteratively and until the application passes each security test sequence in an iteration, generate additional security test sequences. The present invention may be further configured to provide results of the security tests and security test sequences to one or more machine learning models to generate supplementary security test sequences and determine probabilities of the application failing the supplementary security test sequences.

20 Claims, 5 Drawing Sheets

(56) References Cited

U.S. PATENT DOCUMENTS

| | | | | |
|---|---|---|---|---|
| 2019/0258805 | A1* | 8/2019 | Elovici | G06F 11/261 |
| 2019/0340512 | A1* | 11/2019 | Vidal | G06N 20/00 |
| 2019/0377880 | A1* | 12/2019 | Kolychev | H04L 63/1433 |
| 2020/0125730 | A1* | 4/2020 | Keppler | G06F 21/552 |
| 2022/0335137 | A1* | 10/2022 | Canada | G06F 21/52 |

* cited by examiner

ELECTRONIC SYSTEM FOR IDENTIFYING FAULTY CODE AND VULNERABILITIES IN SOFTWARE PROGRAMS USING LINKED EVALUATION TOOLS

FIELD OF THE INVENTION

The present invention embraces an electronic system for identifying faulty code and vulnerabilities in software programs using linked evaluation tools.

BACKGROUND

Security of an application-under-test may be tested by performing dynamic application-under-test security tests ("DAST") that each simulate an individual method that may be used to attempt to obtain unauthorized control of and/or access to the application-under-test, a system running the application-under-test, and/or the like and logging the response of the application-under-test to the security test. The log of application-under-test responses to DAST may be analyzed to reveal weaknesses (e.g., flaws, faults, bugs, vulnerabilities, and/or the like) of the application-under-test that may be potential security vulnerabilities.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, a system for dynamically generating linked security tests is presented. The system may include at least one non-transitory storage device and at least one processing device coupled to the at least one non-transitory storage device, where the at least one processing device is configured to perform security tests on an application (e.g., an application-under-test), parse responses of the application to the security tests to generate results of the security tests, where the results of the security tests include whether the application passed or failed each of the security tests, generate, based on the results of the security tests, initial security test sequences, where each security test sequence, of the initial security test sequences, includes a security test, of the security tests, that the application failed followed by another security test of the security tests, perform the initial security test sequences on the application, and parse responses of the application to the initial security test sequences to generate results of the initial security test sequences, where the results of the initial security test sequences include whether the application passed or failed each of the initial security test sequences. The at least one processing device may be configured to, iteratively and until the application passes each security test sequence of additional security test sequences in an iteration, generate, based on the results of the initial security test sequences or results of the additional security test sequences, the additional security test sequences, where each security test sequence, of the additional security test sequences, includes a security test sequence that the application failed followed by an additional security test of the security tests, perform the additional security test sequences on the application, and parse responses of the application to the additional security test sequences to generate the results of the additional security test sequences, where the results of the additional security test sequences include whether the application passed or failed each of the additional security test sequences. The at least one processing device may be configured to provide, to one or more machine learning models, test data to generate supplementary security test sequences and determine probabilities of the application failing the supplementary security test sequences by determining, for each supplementary security test sequence, a probability of the application failing the supplementary security test sequence, where the test data includes information associated with the security tests, information associated with the initial security test sequences, information associated with the additional security test sequences, the results of the security tests, the results of the initial security test sequences, the results of the additional security test sequences, and/or the like. The at least one processing device may be configured to provide, to a queue for performance on the application and based on the probabilities of the application failing the supplementary security test sequences, one or more of the supplementary security test sequences.

In some embodiments, the at least one processing device is further configured to determine a fingerprint of the application.

In some embodiments, the at least one processing device is further configured to store, in a temporary persistent storage device, the results of the security tests, the results of the initial security test sequences, and the results of the additional security test sequences, where each result of the results of the security tests, the results of the initial security test sequences, and the results of the additional security test sequences includes a type of each security test performed on the application to obtain the result, an order of security tests performed on the application to obtain the result, whether the application passed or failed, an index of probability of applications failing each security test performed on the application to obtain the result, and/or the like, decrease, for each result corresponding to the application passing, the index stored in the temporary persistent storage device, and increase, for each result corresponding to the application failing, the index stored in the temporary persistent storage device.

In some embodiments, the at least one processing device is further configured to parse the results of the security tests, the results of the initial security test sequences, and the results of the additional security test sequences in the temporary persistent storage device to determine, based on the indices, a subset of the security tests, a subset of the initial security test sequences, and a subset of the additional security test sequences associated with higher probabilities of the application failing and generate, based on the subset of the security tests, the subset of the initial security test sequences, and the subset of the additional security test sequences, additional supplementary security test sequences by linking security tests and/or security test sequences.

In some embodiments, the temporary persistent storage device is a first temporary persistent storage device and the at least one processing device is further configured to determine a fingerprint of the application, store, in a second temporary persistent storage device, the parsed results of the security tests, the parsed results of the initial security test sequences, and the parsed results of the additional security test sequences in the temporary persistent storage device, and label, in the second temporary persistent storage device and with the fingerprint, the parsed results of the security tests, the parsed results of the initial security test sequences, and the parsed results of the additional security test sequences in the temporary persistent storage device.

In some embodiments, the second temporary persistent storage device includes other parsed results of security tests and security test sequences performed on one or more other applications, where the other parsed results are labeled with one or more other fingerprints.

In some embodiments, the at least one processing device is further configured to determine a fingerprint of the application and store, in a temporary persistent storage device, the results of the security tests, the results of the initial security test sequences, and the results of the additional security test sequences, where each of the results of the security tests, the results of the initial security test sequences, and the results of the additional security test sequences is associated with the fingerprint of the application.

In some embodiments, each of the results of the security tests, the results of the initial security test sequences, and the results of the additional security test sequences includes a type of each security test performed on the application to obtain the result, an order of security tests performed on the application to obtain the result, whether the application passed or failed, a fingerprint of the application, and/or the like.

In some embodiments, the at least one processing device is further configured to, when providing the one or more of the supplementary security test sequences, provide the one or more of the supplementary security test sequences in an order based on the probabilities of the application failing the supplementary security test sequences, where a first supplementary security test sequence having a highest probability of the application failing is provided first.

In some embodiments, the at least one processing device is further configured to provide the one or more of the supplementary security test sequences to another queue for performance on another application.

In another aspect, a computer program product for dynamically generating linked security tests is presented. The computer program product may include a non-transitory computer-readable medium including code causing a first apparatus to perform security tests on an application, parse responses of the application to the security tests to generate results of the security tests, where the results of the security tests include whether the application passed or failed each of the security tests, generate, based on the results of the security tests, initial security test sequences, where each security test sequence, of the initial security test sequences, includes a security test, of the security tests, that the application failed followed by another security test of the security tests, perform the initial security test sequences on the application, and parse responses of the application to the initial security test sequences to generate results of the initial security test sequences, where the results of the initial security test sequences include whether the application passed or failed each of the initial security test sequences. The non-transitory computer-readable medium may include code causing the first apparatus to, iteratively and until the application passes each security test sequence of additional security test sequences in an iteration, generate, based on the results of the initial security test sequences or results of the additional security test sequences, the additional security test sequences, where each security test sequence, of the additional security test sequences, includes a security test sequence that the application failed followed by an additional security test of the security tests, perform the additional security test sequences on the application, and parse responses of the application to the additional security test sequences to generate the results of the additional security test sequences, where the results of the additional security test sequences include whether the application passed or failed each of the additional security test sequences. The non-transitory computer-readable medium may include code causing the first apparatus to provide, to one or more machine learning models, test data to generate supplementary security test sequences and determine probabilities of the application failing the supplementary security test sequences by determining, for each supplementary security test sequence, a probability of the application failing the supplementary security test sequence, where the test data includes information associated with the security tests, information associated with the initial security test sequences, information associated with the additional security test sequences, the results of the security tests, the results of the initial security test sequences, the results of the additional security test sequences, and/or the like. The non-transitory computer-readable medium may include code causing the first apparatus to provide, to a queue for performance on the application and based on the probabilities of the application failing the supplementary security test sequences, one or more of the supplementary security test sequences.

In some embodiments, the non-transitory computer-readable medium may include code causing the first apparatus to determine a fingerprint of the application.

In some embodiments, the non-transitory computer-readable medium comprises code causing the first apparatus to store, in a temporary persistent storage device, the results of the security tests, the results of the initial security test sequences, and the results of the additional security test sequences, where each result of the results of the security tests, the results of the initial security test sequences, and the results of the additional security test sequences includes a type of each security test performed on the application to obtain the result, an order of security tests performed on the application to obtain the result, whether the application passed or failed, an index of probability of applications failing each security test performed on the application to obtain the result, and/or the like, decrease, for each result corresponding to the application passing, the index stored in the temporary persistent storage device, and increase, for each result corresponding to the application failing, the index stored in the temporary persistent storage device.

In some embodiments, the non-transitory computer-readable medium comprises code causing the first apparatus to parse the results of the security tests, the results of the initial security test sequences, and the results of the additional security test sequences in the temporary persistent storage device to determine, based on the indices, a subset of the security tests, a subset of the initial security test sequences, and a subset of the additional security test sequences associated with higher probabilities of the application failing and generate, based on the subset of the security tests, the subset of the initial security test sequences, and the subset of the additional security test sequences, additional supplementary security test sequences by linking security tests and/or security test sequences.

In some embodiments, the temporary persistent storage device is a first temporary persistent storage device and the non-transitory computer-readable medium comprises code causing the first apparatus to determine a fingerprint of the application, store, in a second temporary persistent storage device, the parsed results of the security tests, the parsed results of the initial security test sequences, and the parsed results of the additional security test sequences in the temporary persistent storage device, and label, in the second temporary persistent storage device and with the fingerprint, the parsed results of the security tests, the parsed results of the initial security test sequences, and the parsed results of the additional security test sequences in the temporary persistent storage device.

In some embodiments, the second temporary persistent storage device includes other parsed results of security tests and security test sequences performed on one or more other applications, where the other parsed results are labeled with one or more other fingerprints.

In some embodiments, the non-transitory computer-readable medium comprises code causing the first apparatus to determine a fingerprint of the application and store, in a temporary persistent storage device, the results of the security tests, the results of the initial security test sequences, and the results of the additional security test sequences, where each of the results of the security tests, the results of the initial security test sequences, and the results of the additional security test sequences is associated with the fingerprint of the application.

In some embodiments, each of the results of the security tests, the results of the initial security test sequences, and the results of the additional security test sequences includes a type of each security test performed on the application to obtain the result, an order of security tests performed on the application to obtain the result, whether the application passed or failed, a fingerprint of the application, and/or the like.

In yet another aspect, a method for dynamically generating linked security tests is presented. The method may include performing security tests on an application, parsing responses of the application to the security tests to generate results of the security tests, where the results of the security tests include whether the application passed or failed each of the security tests, generating, based on the results of the security tests, initial security test sequences, where each security test sequence, of the initial security test sequences, includes a security test, of the security tests, that the application failed followed by another security test of the security tests, performing the initial security test sequences on the application, and parsing responses of the application to the initial security test sequences to generate results of the initial security test sequences, where the results of the initial security test sequences include whether the application passed or failed each of the initial security test sequences. The method may include, iteratively and until the application passes each security test sequence of additional security test sequences in an iteration, generating, based on the results of the initial security test sequences or results of the additional security test sequences, the additional security test sequences, where each security test sequence, of the additional security test sequences, includes a security test sequence that the application failed followed by an additional security test of the security tests, performing the additional security test sequences on the application, and parsing responses of the application to the additional security test sequences to generate the results of the additional security test sequences, where the results of the additional security test sequences include whether the application passed or failed each of the additional security test sequences. The method may include providing, to one or more machine learning models, test data to generate supplementary security test sequences and determine probabilities of the application failing the supplementary security test sequences by determining, for each supplementary security test sequence, a probability of the application failing the supplementary security test sequence, where the test data includes information associated with the security tests, information associated with the initial security test sequences, information associated with the additional security test sequences, the results of the security tests, the results of the initial security test sequences, the results of the additional security test sequences, and/or the like. The method may include providing, to a queue for performance on the application and based on the probabilities of the application failing the supplementary security test sequences, one or more of the supplementary security test sequences.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
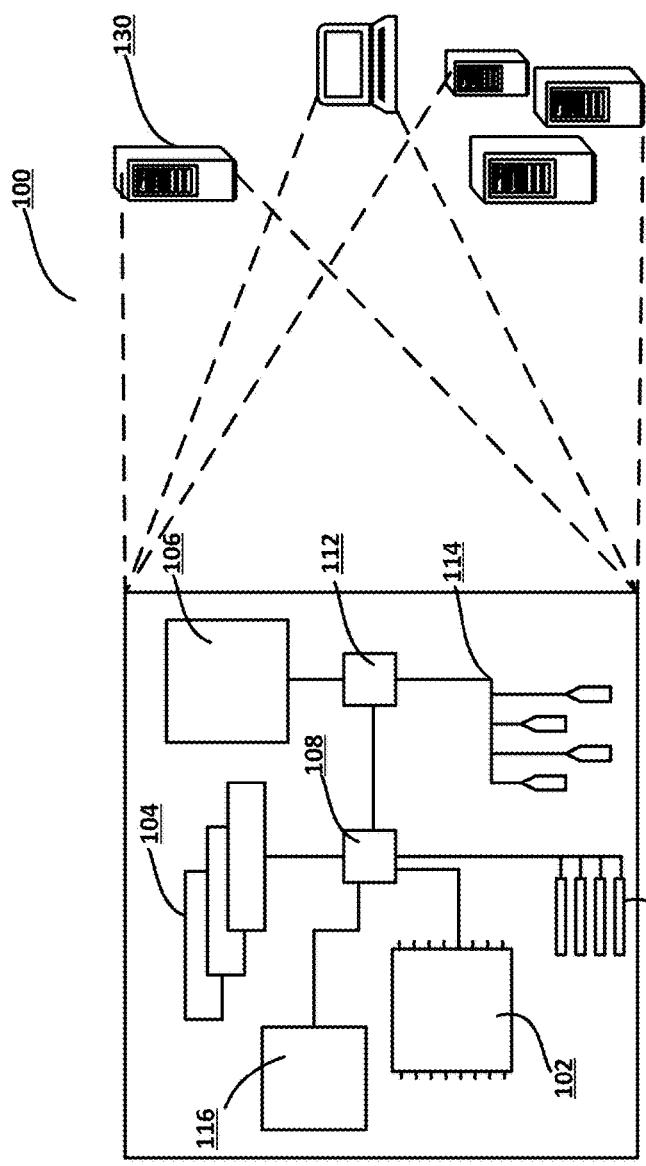
Figure 1:
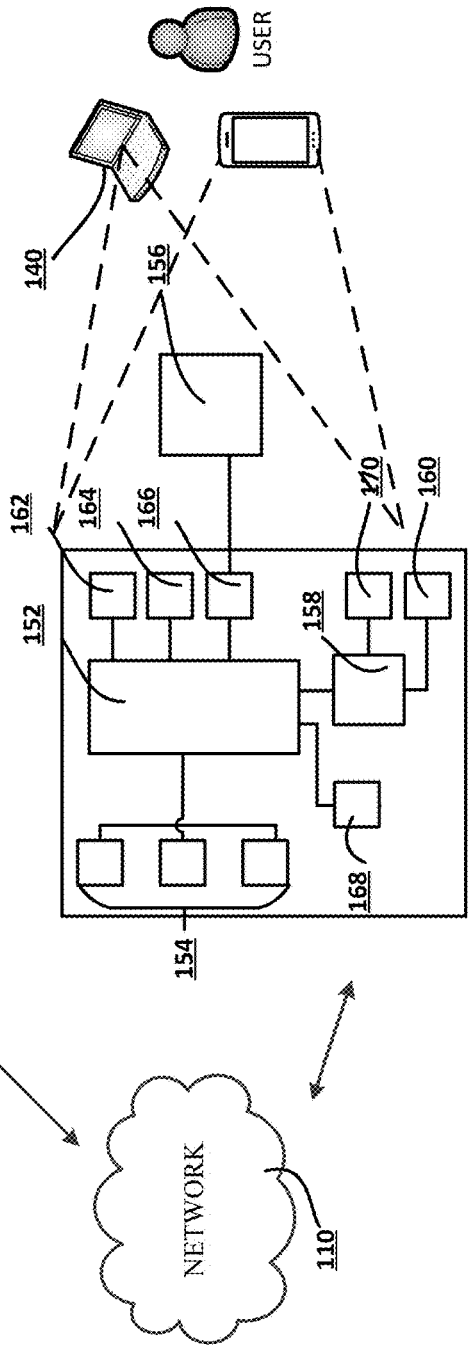
Figure 2:
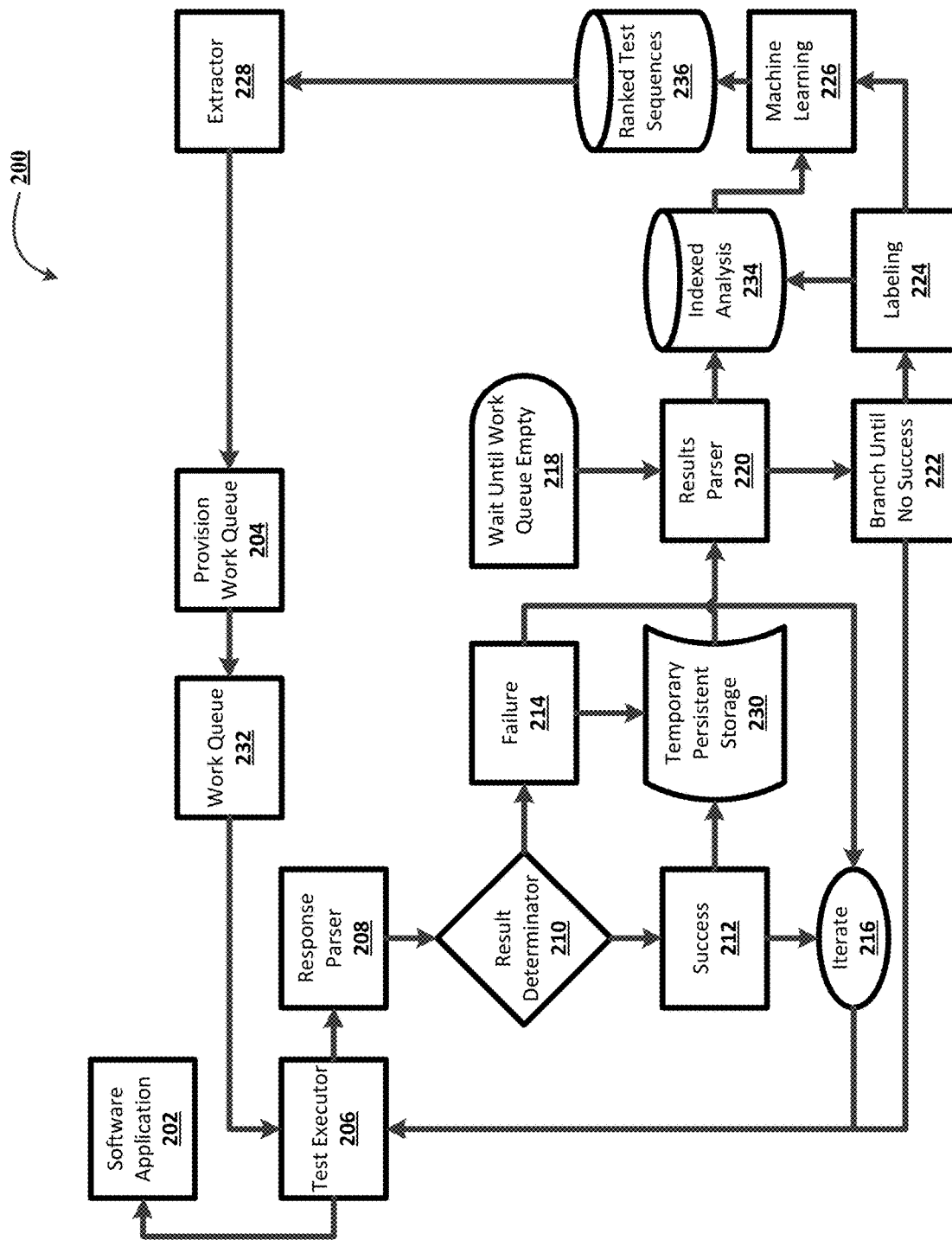
Figure 3A:
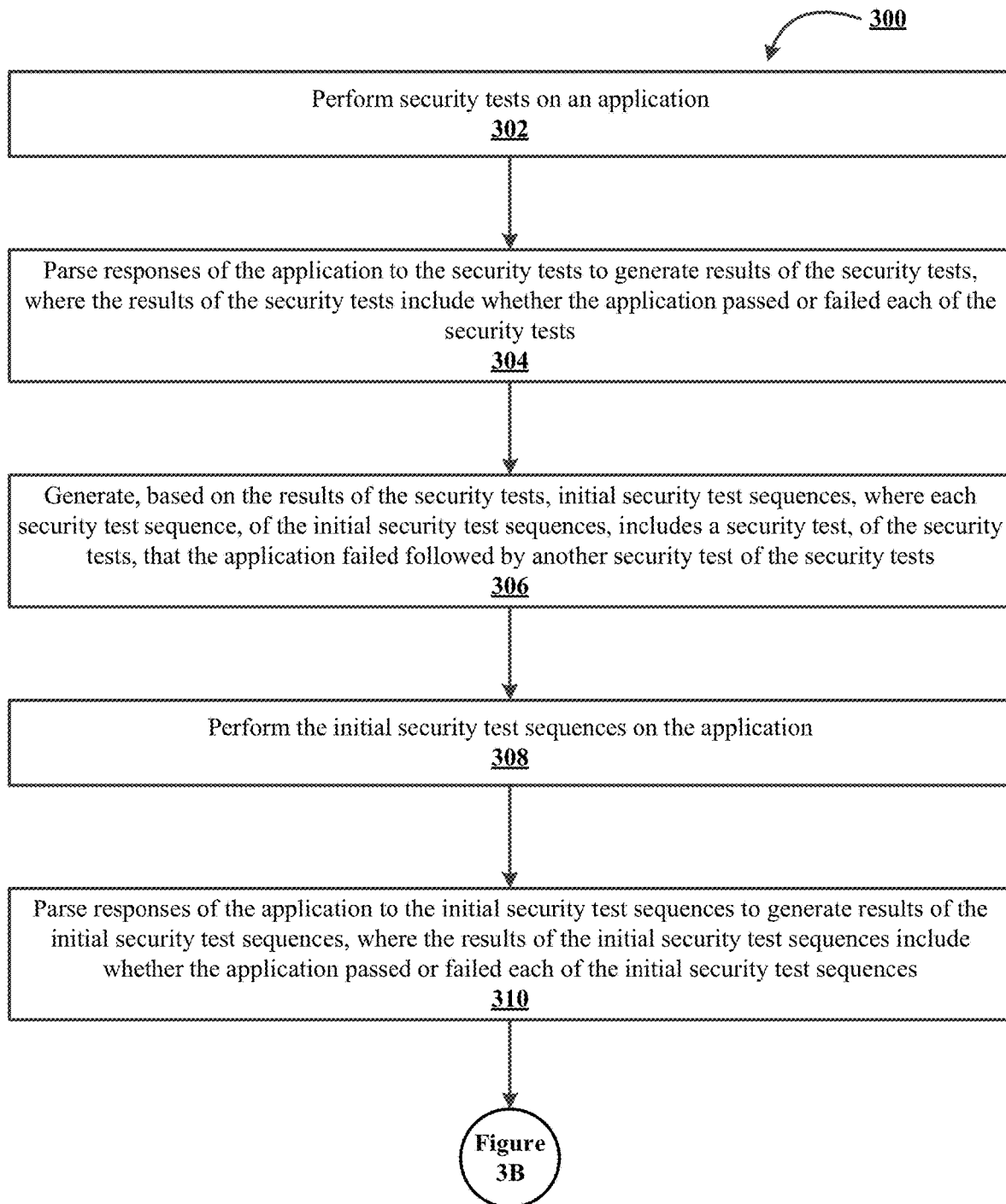
Figure 3B:
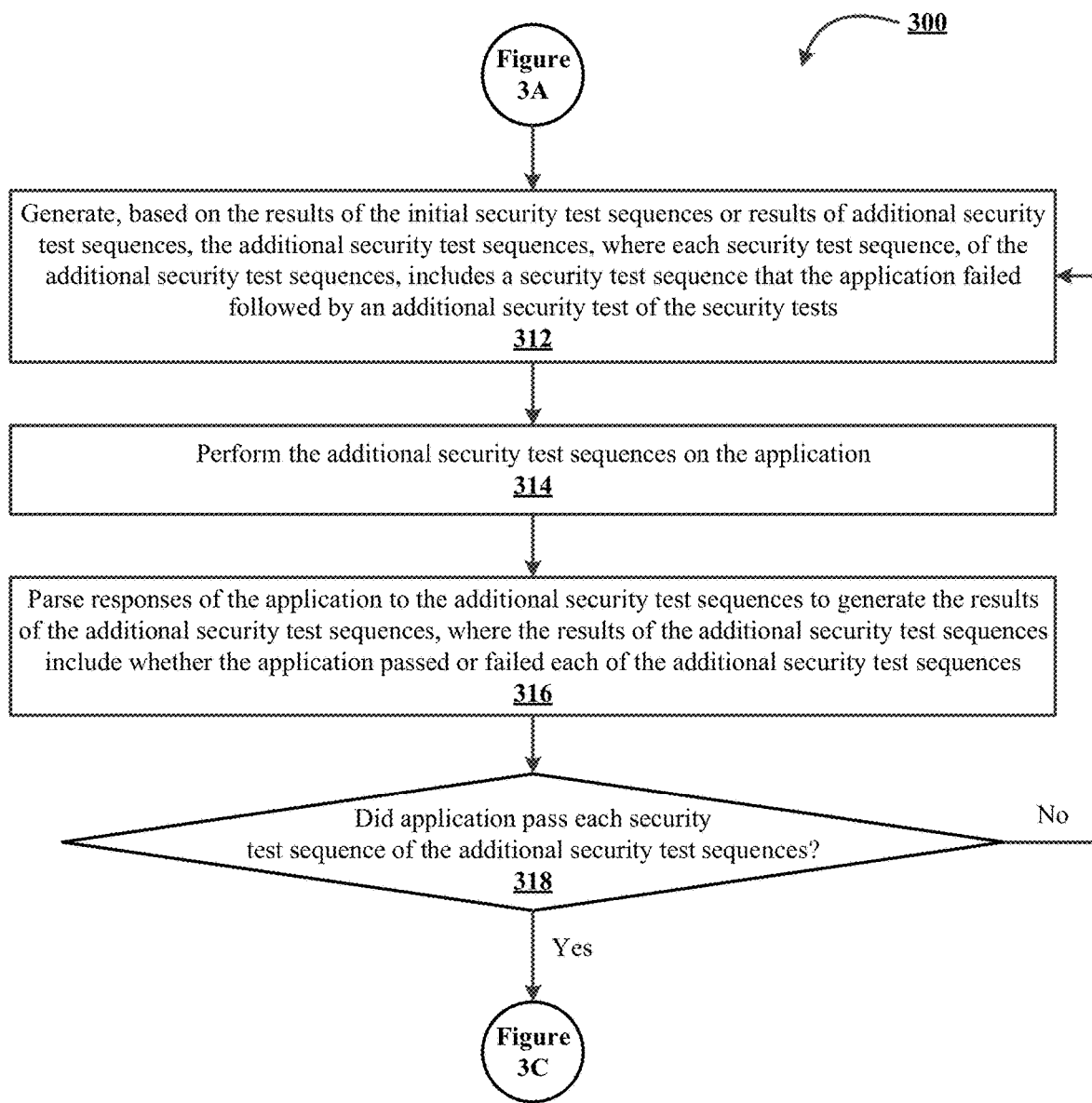
Figure 3C:
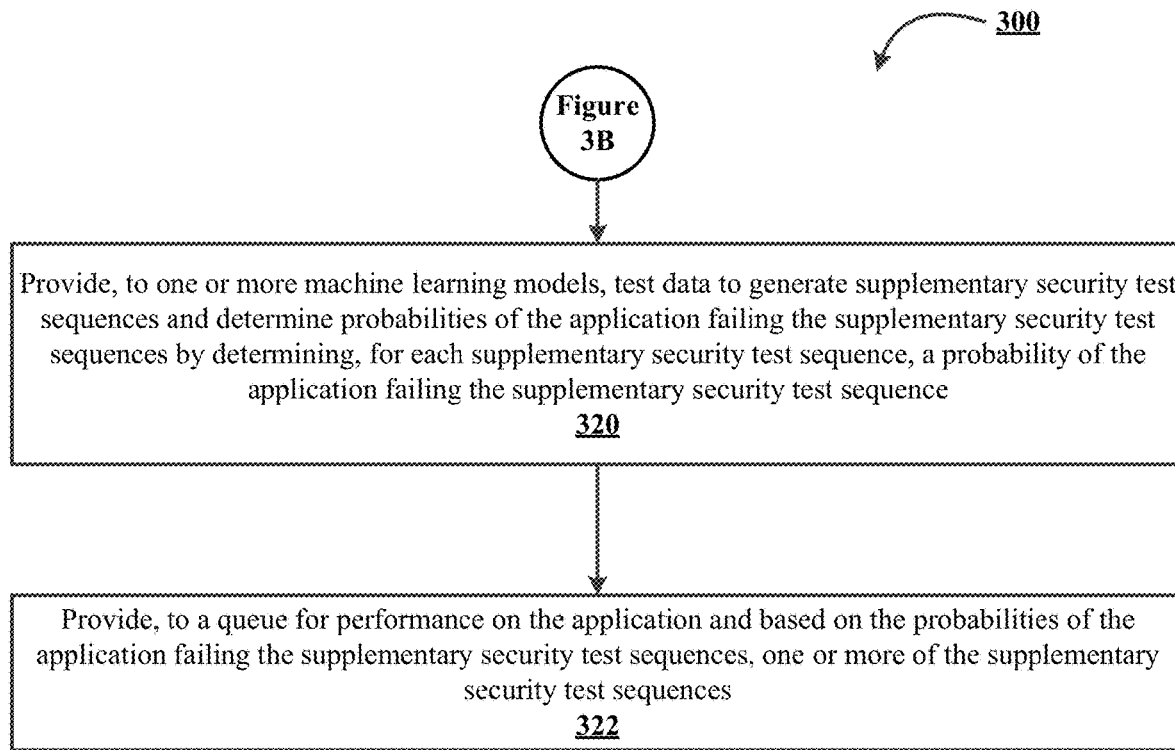

Having thus described embodiments of the invention in general terms, reference will now be made the accompanying drawings, wherein:

FIG. 1 illustrates technical components of a system for dynamically generating linked security tests, in accordance with an embodiment of the invention;

FIG. 2 illustrates a process flow for dynamically generating linked security tests, in accordance with an embodiment of the invention; and FIGS. 3A-3C illustrate a process flow for dynamically generating linked security tests, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, security of an application-under-test may be tested by performing security tests (e.g., evaluation tools) that each simulate a method that may be used to attempt to obtain unauthorized control of and/or access to the application-under-test, a system running the application-under-test, and/or the like and logging the response of the application-under-test to the security test. The log of responses may be analyzed to reveal weaknesses (e.g., flaws, faults, bugs, vulnerabilities, and/or the like) of the application-under-test that may be potential security vulnerabilities. The weaknesses may be categorized using a category system, such as the Common Weakness Enumeration (CWE), and steps may be taken to address the weaknesses of the application. However, because each security test is run individually (e.g., in isolation from other tests), the security tests fail to test logic within the application-under-test and fail to simulate human-driven attempts to obtain unauthorized control of and/or access to the application-under-test, a system running the application-under-test, and/or the like. Furthermore, even running a large number of different security tests in an automated manner fails to accurately simulate unauthorized attempts to obtain unauthorized control of and/or access to the application-under-test, a system running the application-under-test, and/or the like that may occur after the application-under-test is deployed. To test logic within an application-under-test and simulate human-driven attempts to obtain unauthorized control and/or access, a database of linked security tests (e.g., security test sequences) may be manually created and/or maintained. However, manually creating and/or maintaining such a database consumes significant resources (e.g., financial resources, computing resources, network resources, and/or the like), results in sub-optimal effectiveness, and requires substantial human effort.

Some embodiments described herein provide a system, a computer program product, and/or a method for dynamically generating linked security tests. For example, a system (e.g., an electronic system for identifying faulty code and vulnerabilities in software programs using linked evaluation tools and/or the like) may be configured to perform security tests on an application-under-test, generate, based on the results of the security tests, security test sequences (e.g., linked evaluation tools and/or the like) that include at least one security test that the application-under-test failed, perform the security test sequences on the application-under-test, and, iteratively and until the application-under-test passes each security test sequence in an iteration, generate additional security test sequences. The system may be further configured to provide results of the security tests and security test sequences to one or more machine learning models to generate supplementary security test sequences and determine probabilities of the application-under-test failing the supplementary security test sequences. The system may be further configured to perform the supplementary security tests sequences on the application-under-test, another application-under-test, other applications, and/or the like, where the supplementary security test sequences are performed in an order based on the probabilities of the application-under-test failing the supplementary security test sequences. The system may be further configured to provide results of the supplementary security test sequences to the machine learning model to generate additional supplementary security test sequences, further train the machine learning model, and/or the like. In some embodiments, the system may determine a fingerprint of an application-under-test being tested and associate test results with the fingerprint of the application. Additionally, or alternatively, the system may determine a fingerprint of an application-under-test being tested and perform security test sequences based on the fingerprint (e.g., to increase a probability of the application-under-test failing one or more of the security test sequences thereby revealing weaknesses (e.g., flaws, faults, bugs, vulnerabilities, and/or the like) of the application-under-test that may be potential security vulnerabilities.

By using a machine learning model to generate security test sequences, the system may create and maintain a database of linked security tests, security test sequences, and/or the like in a manner that conserves significant resources (e.g., financial resources, computing resources, network resources, and/or the like), improves effectiveness of the testing, and does not require human effort. Additionally, or alternatively, the system may use machine learning techniques to create relationships between test cases based on the test case efficacy (e.g., how often application(s) fail security tests and/or security test sequences). The system may determine test case efficacy by identifying successful test invocations and programmatically attempting test sequencing, where the input to the test sequencing is fed by a probabilistic engine, which may be tied to application-under-test fingerprints. In some embodiments, the system may use machine learning to learn and create security test sequences and reinforce and/or advance the machine learning using a feedback loop (e.g., of data including test results and/or the like).

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, light emitting diode (LED), light, joystick, switch, buzzer, bell, and/or other devices for communicating with one or more users.

As used herein, a "resource" may generally refer to security tests, security test sequences, objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, a payment, processing of funds, purchase of goods or services, a return of goods or services, a payment transaction, a credit transaction, other interactions involving a user's resource or account, and/or the like. In the context of an entity such as a financial institution, a resource distribution and/or an allocation of resources may refer to one or more of a sale of goods and/or services, initiating an automated teller machine (ATM) or online financial session, an account balance inquiry, a rewards transfer, an account money transfer or withdrawal, opening a financial application on a user's computer or mobile device, a user accessing their e-wallet, any other interaction involving the user and/or the user's device that invokes and/or is detectable by the financial institution, and/or the like. In some embodiments, the user may authorize a resource distribution and/or an allocation of resources using a resource distribution instrument (e.g., credit cards, debit cards, checks, digital wallets, currency, loyalty points, and/or the like) and/or resource distribution credentials (e.g., account numbers, resource distribution instrument identifiers, and/or the like). A resource distribution and/or an allocation of resources may include one or more of the following: renting, selling, and/or leasing goods and/or services (e.g., groceries, stamps, tickets, DVDs, vending machine items, and/or the like); making payments to creditors (e.g., paying monthly bills; paying federal, state, and/or local taxes, and/or the like); sending remittances; loading money onto stored value cards (SVCs) and/or prepaid cards; donating to charities; and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In some embodiments, a resource distribution and/or an allocation of resources may refer to financial transactions involving direct or indirect movement of funds through traditional paper transaction processing systems (e.g., paper check processing) or through electronic transaction processing systems. In this regard, resource distributions and/or allocations of resources may refer to the user initiating a purchase for a product, service, or the like from a merchant. Typical financial resource distribution and/or financial allocations of resources include point of sale (POS) transactions, automated teller machine (ATM) transactions, person-to-person (P2P) transfers, internet transactions, online shopping, electronic funds transfers between accounts, transactions with a financial institution teller, personal checks, conducting purchases using loyalty/rewards points, and/or the like. When describing that resource transfers or transactions are evaluated, such descriptions may mean that the transaction has already occurred, is in the process of occurring or being processed, or has yet to be processed/posted by one or more financial institutions.

As used herein, "resource distribution instrument" may refer to an electronic payment vehicle, such as an electronic credit, debit card, and/or the like, associated with a source retainer (e.g., a checking account, a deposit account, a savings account, a credit account, and/or the like). In some embodiments, the resource distribution instrument may not be a "card" and may instead be account identifying information stored electronically in a user device, such as payment credentials and/or tokens and/or aliases associated with a digital wallet, account identifiers stored by a mobile application, and/or the like.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

FIG. 1 presents an exemplary block diagram of a system environment 100 for dynamically generating linked security tests within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, analyze the results of, and/or the like security testing of one or more applications stored thereon. The one or more applications may be configured to communicate with the system 130, execute security tests, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including user-side and server-side processes for dynamically generating linked security tests, in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, smart glasses, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, an software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an electrically erasable programable read-only memory (EEPROM), flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., universal serial bus (USB), Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or non-volatile random-access memory (NVRAM) memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a global positioning system (GPS) device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, short message service (SMS), enterprise messaging system (EMS), or multimedia messaging service (MMS) messaging, code division multiple access (CDMA), time division multiple access (TDMA), packet data convergence (PDC), wideband CDMA (WCDMA), code division multiple access 2000 (CDMA2000), general packet radio service (GPRS), and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or more user input systems and/or one or more application testing systems (e.g., similar to the system 130 and/or the user input system 140) associated with an entity (e.g., a business, a merchant, a financial institution, a card management institution, an software and/or hardware development company, a software and/or hardware testing company, and/or the like). For example, a user (e.g., an employee, a customer, and/or the like) may use a user input system (e.g., similar to the user input system 140) to initiate testing of an application by an application testing system (e.g., similar to the system 130). In some embodiments, the user input system and/or the application testing system associated with the entity may perform one or more of the steps described herein with respect to the process flow described herein with respect to FIGS. 2 and/or 3.

FIG. 2 illustrates a process flow 200 for dynamically generating linked security tests within a technical environment, in accordance with an embodiment of the invention. In some embodiments, a testing system, a test sequence generating system, and/or the like (e.g., similar to one or more of the systems described herein with respect to FIG. 1) may perform one or more of the steps of process flow 200.

As shown in FIG. 2, the process flow 200 may include a software application 202 (e.g., an application-under test), a provision work queue 204, a test executor 206 (e.g., a testing system and/or the like), a response parser 208, a result determinator 210, a success process 212, a failure process 214, an iteration step 216, a delay function 218, a results parser 220, a branch function 222, a labeling function 224, machine learning 226, an extractor 228, a temporary persistent storage 230, a work queue 232, an indexed analysis data structure 234, and a ranked test sequences data structure 236.

In some embodiments, the process flow 200 may include deploying the software application 202. For example, the software application 202 may be a web application. In some embodiments, the process flow 200 may include determining a fingerprint of the software application 202 and/or storing the fingerprint of the software application 202 in the temporary persistent storage 230, the indexed analysis data structure 234, and/or the like. For example, a system may determine the fingerprint of the software application 202 by using a hashing algorithm (e.g., an MD5 hashing algorithm) on a client-side page, a landing page, and/or the like for the software application 202 inclusive of a bill of material content referenced by the client-side page, the landing page, and/or the like.

As shown in FIG. 2, the process flow 200 may include the provision work queue 204 being populated (e.g., by the extractor 228 and/or the like) with security tests (e.g., baseline tranche security test cases), and the provision work queue 204 provisioning the security tests into the work queue 232. The process flow 200 may include the test executor 206 receiving data and/or information from the work queue 232, obtaining test protocols from a test protocols data structure, and/or invoking traffic to perform security testing, based on the test protocols, on the software application 202. For example, the process flow 200 may include the test executor 206 performing a security test on the software application 202 based on the test protocols from the test protocols data structure and based on the data and/or information from the work queue 232. In some embodiments, the test executor 206 may determine the fingerprint of the software application 202 (e.g., in a manner similar to that described above).

As shown in FIG. 2, the process flow 200 may include the response parser 208 receiving response results from the software application 202 triggered by the security testing performed, by the test executor 206, on the software application 202. For example, when the test executor 206 performs a security test on the software application 202 (e.g., based on a test protocol), the software application 202 may generate a response to the security test, and the response parser 208 may receive the response and parse the response.

In some embodiments, the process flow 200 may include determining whether the response from the software application 202 is valid. For example, the process flow 200 may include taking further actions with respect to the response (e.g., storing the response, processing the response, labeling the response, and/or the like) based on determining that the response from the software application 202 is valid. Additionally, or alternatively, the process flow 200 may include not taking further actions with respect to the response based on determining that the response from the software application 202 is invalid and/or providing a notification to the work queue 232 to repeat the security test and/or test protocol that triggered the invalid response from the software application 202.

As shown in FIG. 2, the process flow may include the result determinator 210 receiving the parsed response from the response parser 208 and determining, based on the parsed response, whether the application passed the test or failed the test. For example, the result determinator 210 may analyze the parsed response to determine whether the response generated by the software application 202 includes data, information, and/or the like that may be used to attempt to obtain unauthorized control of and/or access to the software application 202, a system executing the software application 202, a data structure associated with the software application 202, and/or the like.

In some embodiments, if a security test performed by the test executor 206 on the software application 202 causes the software application 202 to generate a response that provides data, information, and/or the like that may be used to attempt to obtain unauthorized control of and/or access to the software application 202, a system executing the software application 202, a data structure associated with the software application 202, and/or the like, the result determinator 210 may send the response to the success process 212 (e.g., because the security test successfully identified a vulnerability in the software application 202). Additionally, or alternatively, if a security test performed by the test executor 206 on the software application 202 causes the software application 202 to generate a response that does not provide data, information, and/or the like that may be used to attempt to obtain unauthorized control of and/or access to the software application 202, a system executing the software application 202, a data structure associated with the software application 202, and/or the like, the result determinator 210 may send the response to the failure process 214 (e.g., because the security test failed to identify a vulnerability in the software application 202).

As shown in FIG. 2, the process flow 200 may include processing the parsed response via the success process 212. In some embodiments, the success process 212 may include storing the parsed response in the temporary persistent storage 230, increasing, in the temporary persistent storage 230, an index of probability of an application failing the security test that generated the parsed response, storing the fingerprint of the software application 202 in the temporary persistent storage 230, storing, in the temporary persistent storage 230, data associated with the parsed response (e.g., data generated by the software application 202 in response to the security test), and/or the like. For example, a system may store, in the temporary persistent storage 230, a test result that includes the type of security test (e.g., a CWE weakness ID associated with the security test and/or the like), the fingerprint of the software application 202, that the software application 202 failed the test, data associated with the parsed response, and/or the like.

As shown in FIG. 2, the process flow 200 may include processing the parsed response via the failure process 214. In some embodiments, the failure process 214 may include storing the parsed response in the temporary persistent storage 230, decreasing, in the temporary persistent storage 230, an index of probability of an application failing the security test that generated the parsed response, storing the fingerprint of the software application 202 in the temporary persistent storage 230, and/or the like. For example, a system may store in the temporary persistent storage 230 a test result that includes the type of security test (e.g., a CWE weakness ID associated with the security test and/or the like), the fingerprint of the software application 202, that the software application 202 passed the test, and/or the like.

As shown in FIG. 2, the process flow 200 may include, after completing the success process 212 and/or the failure process 214, performing the iteration step 216. In some embodiments, the iteration step 216 commands the test executor to request data, test protocols, and/or the like from the work queue 232 to perform the next security test on the software application 202. Additionally, or alternatively, the process flow 200 may include iteratively performing security tests on the software application 202 with the test executor 206, parsing responses of the software application 202 with the response parser 208, determining results of the security test using the result determinator, processing the parsed response via the success process 212 and/or the failure process 214, storing results in the temporary persistent storage 230, and/or the like until the work queue 232 is empty.

As shown in FIG. 2, the process flow 200 may include the delay function 218. In some embodiments, the delay function 218 may control one or more other processes and/or functions in the process flow 200 such that the one or more other processes and/or functions cannot begin and/or execute until an event occurs in the process flow 200. For example, and as shown in FIG. 2, the delay function 218 may control the results parser 220 to force the results parser 220 to wait until the work queue 232 is empty before initiating.

As also shown in FIG. 2, the process flow 200 may include the results parser 220 parsing the test results stored in the temporary persistent storage 230. In some embodiments, the process flow 200 may include the results parser 220 storing the test results in the indexed analysis data structure 234. For example, the results parser 220 may parse the test results stored in the temporary persistent storage 230 to determine, based on the test results and for each security test, an index of probability of an application failing the security test and store the determined indices with the test results in the indexed analysis data structure 234.

Additionally, or alternatively, the results parser 220 may parse the test results stored in the temporary persistent storage 230 for security tests associated with higher probabilities of applications failing (e.g., by higher indices and/or the like) and temporally-optimistically-temporarily link each security test to each security test associated with higher probabilities of applications failing. For example, the results parser 220 may generate security test sequences (e.g., by linking security tests and/or the like), where each security test sequence includes a security test that the application failed followed by another security test.

As shown in FIG. 2, the process flow 200 may include the results parser 220 providing the linked security tests (e.g., the generated test sequences) to the branch function 222 and the branch function 222 providing the linked security tests to the test executor 206. In some embodiments, the process flow 200 may include iteratively performing linked security tests on the software application 202 with the test executor 206, parsing responses of the software application 202 with the response parser 208, determining results of the linked security tests using the result determinator 210, processing the parsed response via the success process 212 and/or the failure process 214, storing results in the temporary persistent storage 230, parsing the test results stored in the temporary persistent storage 230 with the results parser 220 to generate additional linked security tests, providing the additional linked security tests to the branch function 222, and providing the additional linked security tests to the test executor 206 for performance on the software application 202, and/or the like until the application passes each additional linked security test. For example, the process flow 200 may include stopping the branch function 222 based on the application passing each additional linked security test generated by the response parser 208 since the branch function 222 had last been executed.

In some embodiments, the process flow 200 may include iteratively appending security tests for performance on the software application 202 and stopping appending security tests based on the software application 202 not failing security tests. Additionally, or alternatively, the process flow 200 may include monitoring the performance and/or generation of the additional linked security tests and stopping the branch function 222 based on responses of the software application 202 to the additional linked security tests.

As shown in FIG. 2, the process flow 200 may include labelling, with the labeling function 224, the test results from the success process 212 (e.g., the test results for which the software application 202 failed a security test and/or linked security tests and/or the like). For example, the process flow 200 may include labelling, with the labeling function 224, the test results from the success process 212 with the fingerprint of the software application 202.

In some embodiments, and as shown in FIG. 2, the process flow 200 may include labelling, with the labeling function 224, the test results from the success process 212 in the indexed analysis data structure 234. Additionally, or alternatively, and as also shown in FIG. 2, the process flow 200 may include labelling, with the labeling function 224, the test results from the success process 212 and providing the labeled test results to the machine learning 226.

As shown in FIG. 2, the process flow 200 may include analyzing, using the machine learning 226 (e.g., a clustering machine learning algorithm, a genetic machine learning algorithm, and/or the like), the test results from the success process 212 (e.g., the labeled test results from the labeling function 224, the test results in the indexed analysis data structure 234, and/or the like). In some embodiments, the process flow 200 may include analyzing, using the machine learning 226, the test results from the success process 212 to increase a probability of a software application (e.g., the software application 202, another software application, and/or the like) failing a security test sequence. Additionally, or alternatively, the process flow 200 may include analyzing, using the machine learning 226, the test results to generate additional security test sequences (e.g., by linking security tests, by linking security tests and previously generated security test sequences, by linking previously generated security test sequences, and/or the like). In some embodiments, the process flow 200 may include analyzing, using the machine learning 226, the test results to determine probabilities of a software application (e.g., the software application 202, another software application, and/or the like) failing the additional security test sequences generated using the machine learning 226.

As shown in FIG. 2, the process flow 200 may include storing, in the ranked test sequences data structure 236, security test sequences generated using the machine learning 226 and/or security test sequences corresponding to test results analyzed using the machine learning 226. In some embodiments, the process flow 200 may include storing, in the ranked test sequences data structure 236, security test sequences in an order based on probabilities of a software application (e.g., the software application 202, another software application, and/or the like) failing the security test sequences. Additionally, or alternatively, the security test sequences stored in the ranked test sequences data structure 236 may be labelled, tagged, and/or the like with a fingerprint of the software application on which the security test sequences were performed (e.g., the software application 202, another software application, and/or the like). In some embodiments, the process flow 200 may include grouping, using the machine learning 226 and in the ranked test sequences data structure 236, the security test sequences.

As shown in FIG. 2, the process flow 200 may include linking, with the extractor 228, security test sequences (e.g., in the ranked test sequences data structure 236) having higher probabilities of a software application failing the security test sequences with other security test sequences (e.g., in the ranked test sequences data structure 236) having lower probabilities of a software application failing the security test sequences (e.g., lower probabilities due to not enough data and/or the like). As also shown in FIG. 2, the process flow 200 may include providing the security test sequences linked by the extractor 228 to the provision work queue 204.

In some embodiments, the process flow 200 may include repeating previously described steps of the process flow 200 using the security test sequences linked by the extractor 228. For example, the process flow 200 may include performing, with the test executor 206, the security test sequences linked by the extractor 228 on the software application 202, parsing, with the response parser 208, the responses of the software application 202 to the security test sequences linked by the extractor 228, determining, with the result determinator 210, whether the software application 202 passed or failed the security test sequences linked by the extractor 228, and/or the like. In this way, the process flow 200 may further train the machine learning 226, further improve the ranking of security test sequences in the ranked test sequences data structure 236, and dynamically generate linked security tests. Furthermore, improving the ranking of security test sequences in the ranked test sequences data structure 236 increases the efficacy of the learning of the machine learning 226.

Process flow 200 may include additional embodiments, such as any single embodiment or any combination of embodiments described below and/or in connection with one or more other processes described elsewhere herein. Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

FIGS. 3A-3C illustrate a process flow 300 for dynamically generating linked security tests within a technical environment, in accordance with an embodiment of the invention. In some embodiments, a testing system, a test sequence generating system, and/or the like (e.g., similar to one or more of the systems described herein with respect to FIG. 1) may perform one or more of the steps of process flow 300.

As shown in block 302 of FIG. 3A, the process flow 300 may include performing security tests on an application. For example, a testing system and/or a test sequence generating system may perform security tests on an application (e.g., an application-under-test).

As shown in block 304, the process flow 300 may include parsing responses of the application to the security tests to generate results of the security tests, where the results of the security tests include whether the application passed or failed each of the security tests. For example, a testing system and/or a test sequence generating system may parse responses of the application-under-test to the security tests to generate results of the security tests. In some embodiments, the results of the security tests include whether the application-under-test passed or failed each of the security tests.

As shown in block 306, the process flow 300 may include generating, based on the results of the security tests, initial security test sequences, where each security test sequence, of the initial security test sequences, includes a security test, of the security tests, that the application failed followed by another security test of the security tests. For example, a testing system and/or a test sequence generating system may generate, based on the results of the security tests, initial security test sequences. In some embodiments, each security test sequence, of the initial security test sequences, includes a security test, of the security tests, that the application-under-test failed followed by another security test of the security tests. Additionally, or alternatively, the testing system and/or the test sequence generating system may link the security test that the application-under-test failed to another security test to generate the initial security test sequence. In some embodiments, the other security test to which the security test that the application-under-test failed is linked may be a security test of a similar type (e.g., for identifying a weakness having a similar CWE weakness ID and/or the like), a different type (e.g., for identifying a weakness having a different CWE weakness ID and/or the like), and/or the like.

As shown in block 308, the process flow 300 may include performing the initial security test sequences on the application. For example, a testing system and/or a test sequence generating system may perform the initial security test sequences on the application.

As shown in block 310, the process flow 300 may include parsing responses of the application to the initial security test sequences to generate results of the initial security test sequences, where the results of the initial security test sequences include whether the application passed or failed each of the initial security test sequences. For example, a testing system and/or a test sequence generating system may parse responses of the application-under-test to the initial security test sequences to generate results of the initial security test sequences. In some embodiments, the results of the initial security test sequences include whether the application-under-test passed or failed each of the initial security test sequences.

As shown in block 312 of FIG. 3B, the process flow 300 may include generating, based on the results of the initial security test sequences or results of the additional security test sequences, the additional security test sequences, where each security test sequence, of the additional security test sequences, includes a security test sequence that the application failed followed by an additional security test of the security tests. For example, a testing system and/or a test sequence generating system may generate, based on the results of the initial security test sequences or results of the additional security test sequences, the additional security test sequences. In some embodiments, each security test sequence, of the additional security test sequences, includes a security test sequence that the application-under-test failed followed by an additional security test of the security tests. For example, the testing system and/or a test sequence generating system may link a security test sequence that the application-under-test failed with another security test to generate an additional security test sequence.

As shown in block 314, the process flow 300 may include performing the additional security test sequences on the application. For example, a testing system and/or a test sequence generating system may perform the additional security test sequences on the application.

As shown in block 316, the process flow 300 may include parsing responses of the application to the additional security test sequences to generate the results of the additional security test sequences, wherein the results of the additional security test sequences include whether the application passed or failed each of the additional security test sequences. For example, a testing system and/or a test sequence generating system may parse responses of the application-under-test to the additional security test sequences to generate the results of the additional security test sequences. In some embodiments, the results of the additional security test sequences include whether the application-under-test passed or failed each of the additional security test sequences.

As shown in block 318, the process flow 300 may include determining whether the application passed each security test sequence of the additional security test sequences. For example, a testing system and/or a test sequence generating system may determine whether the application passed each security test sequence of the additional security test sequences. Based on determining that the application did not pass each security test sequence of the additional security test sequences, the process flow 300 may include repeating block 312 by generating, based on the results of the additional test sequences, other additional security test sequences, where each other additional security test sequence, of the other additional security test sequences, includes a security test sequence (e.g., of the additional security test sequences and/or the like) that the application failed followed by an additional security test of the security tests and repeating blocks 314, 316, and 318.

In some embodiments, the process flow 300 may include performing blocks 312, 314, 316, and 318 iteratively and until the application passes each security test sequence of the additional security test sequences in an iteration. Additionally, or alternatively, the process flow 300 may include monitoring generation of the additional security test sequences and stopping generation of the additional security test sequences (e.g., based on one or more responses of the application and/or the like).

As shown in FIG. 3B, based on determining that the application passed each security test sequence of the additional security test sequences, the process flow 300 may continue to block 320 as shown in FIG. 3C. As shown in block 320, the process flow 300 may include providing, to one or more machine learning models, test data to generate supplementary security test sequences and determine probabilities of the application failing the supplementary security test sequences by determining, for each supplementary security test sequence, a probability of the application failing the supplementary security test sequence. For example, a testing system and/or a test sequence generating system may provide the test data to one or more machine learning models to generate supplementary security test sequences and determine probabilities of the application failing the supplementary security test sequences by determining, for each supplementary security test sequence, a probability of the application failing the supplementary security test sequence. In some embodiments, the test data provided to the one or more machine learning models may include information associated with the security tests, information associated with the initial security test sequences, information associated with the additional security test sequences, the results of the security tests, the results of the initial security test sequences, the results of the additional security test sequences, and/or the like.

As shown in block 322, the process flow 300 may include providing, to a queue for performance on the application and based on the probabilities of the application failing the supplementary security test sequences, one or more of the supplementary security test sequences. For example, a testing system and/or a test sequence generating system may provide, to a queue for performance on the application-under-test and based on the probabilities of the application-under-test failing the supplementary security test sequences, one or more of the supplementary security test sequences.

In some embodiments, the process flow 300 may include performing one or more of the supplementary security test sequences on the application, parsing responses of the applications to the one or more of the supplementary security test sequences, and generating additional security test sequences in a manner similar to that described herein with respect to other portions of process flow 300. For example, the process flow 300 may include performing blocks 312-322 with respect to the supplementary security test sequences to generate further security test sequences and then performing blocks 312-322 again with respect to the further security test sequences.

Process flow 300 may include additional embodiments, such as any single embodiment or any combination of embodiments described below and/or in connection with one or more other processes described elsewhere herein.

In a first embodiment, the process flow 300 may include determining a fingerprint of the application.

In a second embodiment alone or in combination with the first embodiment, the process flow 300 may include storing, in a temporary persistent storage device, the results of the security tests, the results of the initial security test sequences, and the results of the additional security test sequences, where each result of the results of the security tests, the results of the initial security test sequences, and the results of the additional security test sequences includes a type of each security test performed on the application to obtain the result, an order of security tests performed on the application to obtain the result, whether the application passed or failed, an index of probability of applications failing each security test performed on the application to obtain the result, and/or the like, decreasing, for each result corresponding to the application passing, the index stored in the temporary persistent storage device, and increasing, for each result corresponding to the application failing, the index stored in the temporary persistent storage device.

In a third embodiment alone or in combination with any of the first through second embodiments, the process flow 300 may include parsing the results of the security tests, the results of the initial security test sequences, and the results of the additional security test sequences in the temporary persistent storage device to determine, based on the indices, a subset of the security tests, a subset of the initial security test sequences, and a subset of the additional security test sequences associated with higher probabilities of the application failing and generating, based on the subset of the security tests, the subset of the initial security test sequences, and the subset of the additional security test sequences, additional supplementary security test sequences by linking security tests and/or security test sequences. By increasing and/or decreasing the indices, a system performing the process flow 300 may thereby learn test sequence linkage efficacy (e.g., a machine learning model may learn test sequence linkage efficacy based on the indices).

In a fourth embodiment alone or in combination with any of the first through third embodiments, where the temporary persistent storage device is a first temporary persistent storage device and the process flow 300 may include determining a fingerprint of the application, storing, in a second temporary persistent storage device, the parsed results of the security tests, the parsed results of the initial security test sequences, and the parsed results of the additional security test sequences in the temporary persistent storage device, and labeling, in the second temporary persistent storage device and with the fingerprint, the parsed results of the security tests, the parsed results of the initial security test sequences, and the parsed results of the additional security test sequences in the temporary persistent storage device.

In a fifth embodiment alone or in combination with any of the first through fourth embodiments, the second temporary persistent storage device includes other parsed results of security tests and security test sequences performed on one or more other applications, where the other parsed results are labeled with one or more other fingerprints.

In a sixth embodiment alone or in combination with any of the first through fifth embodiments, the process flow 300 may include determining a fingerprint of the application and storing, in a temporary persistent storage device, the results of the security tests, the results of the initial security test sequences, and the results of the additional security test sequences, where each of the results of the security tests, the results of the initial security test sequences, and the results of the additional security test sequences is associated with the fingerprint of the application.

In a seventh embodiment alone or in combination with any of the first through sixth embodiments, each of the results of the security tests, the results of the initial security test sequences, and the results of the additional security test sequences includes a type of each security test performed on the application to obtain the result, an order of security tests performed on the application to obtain the result, whether the application passed or failed, a fingerprint of the application, and/or the like.

In an eighth embodiment alone or in combination with any of the first through seventh embodiments, the process flow 300 may include, when providing the one or more of the supplementary security test sequences, providing the one or more of the supplementary security test sequences in an order based on the probabilities of the application failing the supplementary security test sequences, where a first supplementary security test sequence having a highest probability of the application failing is provided first.

In a ninth embodiment alone or in combination with any of the first through eighth embodiments, the process flow 300 may include providing the one or more of the supplementary security test sequences to another queue for performance on another application.

Although FIG. 3 shows example blocks of process flow 300, in some embodiments, process flow 300 may include additional blocks, fewer blocks, different blocks, or differently arranged blocks than those depicted in FIG. 3. Additionally, or alternatively, two or more of the blocks of process flow 300 may be performed in parallel.

In some embodiments, a testing system may perform testing on an application before deployment of the application and/or at a time of deploying the application, which may permit weaknesses of the application to be resolved earlier, thereby conserving financial, computer, and/or network resources consumed by weaknesses of the application. In some embodiments, the testing system may identify business logic tests, which are currently undetectable. In some embodiments, the testing system may perform automated business logic testing.

As noted above, in some embodiments, the process flow 200 and/or the process flow 300 may include performing one or more of the functions described herein using machine learning and/or a machine learning model. For example, the system may provide data from parsed responses, data from successful security tests and/or security test sequences (e.g., security tests and/or security test sequences that one or more applications failed), data from indices of probability of applications failing security tests and/or security test sequences, types of security test and/or security test sequences, fingerprints of applications, an order in which security tests are performed on one or more applications, information associated with security tests and/or security test sequences, time periods spent performing and/or generating security test sequences, a number of the security test sequences performed and/or generated during the time periods that the application failed, and/or the like to a machine learning model trained (e.g., using historical data) to output security test sequences, probabilistically-ranked test sequences, test sequences grouped by fingerprints of applications, and/or the like.

In some embodiments, the system may be configured to implement any of the following applicable machine learning algorithms either singly or in combination: supervised learning (e.g., using logistic regression, using back propagation neural networks, using random forests, decision trees, and/or the like), unsupervised learning (e.g., using an Apriori algorithm, using K-means clustering), semi-supervised learning, reinforcement learning (e.g., using a Q-learning algorithm, using temporal difference learning), and any other suitable learning style. Each module of the system may implement any one or more of: a regression algorithm (e.g., ordinary least squares, logistic regression, stepwise regression, multivariate adaptive regression splines, locally estimated scatterplot smoothing, and/or the like), an instance-based method (e.g., k-nearest neighbor, learning vector quantization, self-organizing map, and/or the like), a regularization method (e.g., ridge regression, least absolute shrinkage and selection operator, elastic net, and/or the like), a decision tree learning method (e.g., classification and regression tree, iterative dichotomiser 3, C4.5, chi-squared automatic interaction detection, decision stump, random forest, multivariate adaptive regression splines, gradient boosting machines, and/or the like), a Bayesian method (e.g., naïve Bayes, averaged one-dependence estimators, Bayesian belief network, and/or the like), a kernel method (e.g., a support vector machine, a radial basis function, a linear discriminant analysis, and/or the like), a clustering method (e.g., k-means clustering, expectation maximization, and/or the like), an associated rule learning algorithm (e.g., an Apriori algorithm, an Eclat algorithm, and/or the like), an artificial neural network model (e.g., a Perceptron method, a back-propagation method, a Hopfield network method, a self-organizing map method, a learning vector quantization method, and/or the like), a deep learning algorithm (e.g., a restricted Boltzmann machine, a deep belief network method, a convolution network method, a stacked auto-encoder method, and/or the like), a dimensionality reduction method (e.g., principal component analysis, partial least squares regression, Sammon mapping, multidimensional scaling, projection pursuit, and/or the like), an ensemble method (e.g., boosting, bootstrapped aggregation, Ada-Boost, stacked generalization, gradient boosting machine method, random forest method, and/or the like), and any suitable form of machine learning algorithm. Each processing portion of the system may additionally or alternatively leverage a probabilistic module, heuristic module, deterministic module, or any other suitable module leveraging any other suitable computation method, machine learning method or combination thereof. However, any suitable machine learning approach may otherwise be incorporated in the system. Further, any suitable model (e.g., machine learning, non-machine learning, and/or the like) may be used in generating data relevant to the system. In some embodiments, the one or more machine learning algorithms may be predictive modeling algorithms configured to use data and statistics to predict outcomes with forecasting models.

In some embodiments, the machine learning model may be generated by training on data from parsed responses, data from successful security tests and/or security test sequences (e.g., security tests and/or security test sequences that one or more applications failed), data from indices of probability of applications failing security tests and/or security test sequences, types of security test and/or security test sequences, fingerprints of applications, an order in which security tests are performed on one or more applications, information associated with security tests and/or security test sequences, time periods spent performing and/or generating security test sequences, a number of the security test sequences performed and/or generated during the time periods that the application failed, and/or the like over a predetermined past period of time. In doing so, the system may be configured to generate security test sequences, probabilistically ranked test sequences, test sequences grouped by fingerprints of applications, and/or the like. In some embodiments, the one or more machine learning algorithms may be used to calculate likelihoods of a software application passing or failing a security test and/or a security test sequence, and whether the likelihood satisfies a threshold.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, statistical analysis system (SAS), structured query language (SQL), Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for dynamically generating linked security tests, the system comprising:
   at least one non-transitory storage device; and
   at least one processing device coupled to the at least one non-transitory storage device, wherein the at least one processing device is configured to:
   perform security tests on an application;
   parse responses of the application to the security tests to generate results of the security tests, wherein the results of the security tests comprise whether the application passed or failed each of the security tests;
   generate, based on the results of the security tests, initial security test sequences, wherein each security test sequence, of the initial security test sequences, comprises a security test, of the security tests, that the application failed followed by another security test of the security tests;
   perform the initial security test sequences on the application;
   parse responses of the application to the initial security test sequences to generate results of the initial security test sequences, wherein the results of the initial security test sequences comprise whether the application passed or failed each of the initial security test sequences;
   iteratively and until the application passes each security test sequence of additional security test sequences in an iteration:
      generate, based on the results of the initial security test sequences or results of the additional security test sequences, the additional security test sequences, wherein each security test sequence, of the additional security test sequences, comprises a security test sequence that the application failed followed by an additional security test of the security tests;
      perform the additional security test sequences on the application; and
      parse responses of the application to the additional security test sequences to generate the results of the additional security test sequences, wherein the results of the additional security test sequences comprise whether the application passed or failed each of the additional security test sequences;
   provide, to one or more machine learning models, test data to:
      generate supplementary security test sequences; and
      determine probabilities of the application failing the supplementary security test sequences by determining, for each supplementary security test sequence, a probability of the application failing the supplementary security test sequence, wherein the test data comprises:
         information associated with the security tests;
         information associated with the initial security test sequences;
         information associated with the additional security test sequences;
         the results of the security tests;
         the results of the initial security test sequences; and
         the results of the additional security test sequences; and
   provide, to a queue for performance on the application and based on the probabilities of the application failing the supplementary security test sequences, one or more of the supplementary security test sequences.

2. The system of claim 1, wherein the at least one processing device is further configured to determine a fingerprint of the application.

3. The system of claim 1, wherein the at least one processing device is further configured to:
- store, in a temporary persistent storage device, the results of the security tests, the results of the initial security test sequences, and the results of the additional security test sequences, wherein each result of the results of the security tests, the results of the initial security test sequences, and the results of the additional security test sequences comprises:
  - a type of each security test performed on the application to obtain the result;
  - an order of security tests performed on the application to obtain the result;
  - whether the application passed or failed; and
  - an index of probability of applications failing each security test performed on the application to obtain the result;
- decrease, for each result corresponding to the application passing, the index stored in the temporary persistent storage device; and
- increase, for each result corresponding to the application failing, the index stored in the temporary persistent storage device.

4. The system of claim 3, wherein the at least one processing device is further configured to:
- parse the results of the security tests, the results of the initial security test sequences, and the results of the additional security test sequences in the temporary persistent storage device to determine, based on the indices, a subset of the security tests, a subset of the initial security test sequences, and a subset of the additional security test sequences associated with higher probabilities of the application failing; and
- generate, based on the subset of the security tests, the subset of the initial security test sequences, and the subset of the additional security test sequences, additional supplementary security test sequences by linking security tests and/or security test sequences.

5. The system of claim 4, wherein the temporary persistent storage device is a first temporary persistent storage device, and wherein the at least one processing device is further configured to:
- determine a fingerprint of the application;
- store, in a second temporary persistent storage device, the parsed results of the security tests, the parsed results of the initial security test sequences, and the parsed results of the additional security test sequences in the temporary persistent storage device; and
- label, in the second temporary persistent storage device and with the fingerprint, the parsed results of the security tests, the parsed results of the initial security test sequences, and the parsed results of the additional security test sequences in the temporary persistent storage device.

6. The system of claim 5, wherein the second temporary persistent storage device comprises other parsed results of security tests and security test sequences performed on one or more other applications, and wherein the other parsed results are labeled with one or more other fingerprints.

7. The system of claim 1, wherein the at least one processing device is further configured to:
- determine a fingerprint of the application; and
- store, in a temporary persistent storage device, the results of the security tests, the results of the initial security test sequences, and the results of the additional security test sequences, wherein each of the results of the security tests, the results of the initial security test sequences, and the results of the additional security test sequences is associated with the fingerprint of the application.

8. The system of claim 1, wherein each of the results of the security tests, the results of the initial security test sequences, and the results of the additional security test sequences comprises:
- a type of each security test performed on the application to obtain the result;
- an order of security tests performed on the application to obtain the result;
- whether the application passed or failed; and
- a fingerprint of the application.

9. The system of claim 1, wherein the at least one processing device is further configured to, when providing the one or more of the supplementary security test sequences, provide the one or more of the supplementary security test sequences in an order based on the probabilities of the application failing the supplementary security test sequences, wherein a first supplementary security test sequence having a highest probability of the application failing is provided first.

10. The system of claim 1, wherein the at least one processing device is further configured to provide the one or more of the supplementary security test sequences to another queue for performance on another application.

11. A computer program product for dynamically generating linked security tests, the computer program product comprising a non-transitory computer-readable medium comprising code causing a first apparatus to:
- perform security tests on an application;
- parse responses of the application to the security tests to generate results of the security tests, wherein the results of the security tests comprise whether the application passed or failed each of the security tests;
- generate, based on the results of the security tests, initial security test sequences, wherein each security test sequence, of the initial security test sequences, comprises a security test, of the security tests, that the application failed followed by another security test of the security tests;
- perform the initial security test sequences on the application;
- parse responses of the application to the initial security test sequences to generate results of the initial security test sequences, wherein the results of the initial security test sequences comprise whether the application passed or failed each of the initial security test sequences;
- iteratively and until the application passes each security test sequence of additional security test sequences in an iteration:
  - generate, based on the results of the initial security test sequences or results of the additional security test sequences, the additional security test sequences, wherein each security test sequence, of the additional security test sequences, comprises a security test sequence that the application failed followed by an additional security test of the security tests;
  - perform the additional security test sequences on the application; and
  - parse responses of the application to the additional security test sequences to generate the results of the additional security test sequences, wherein the results of the additional security test sequences comprise whether the application passed or failed each of the additional security test sequences;

provide, to one or more machine learning models, test data to:

generate supplementary security test sequences; and determine probabilities of the application failing the supplementary security test sequences by determining, for each supplementary security test sequence, a probability of the application failing the supplementary security test sequence, wherein the test data comprises:

information associated with the security tests;

information associated with the initial security test sequences;

information associated with the additional security test sequences;

the results of the security tests;

the results of the initial security test sequences; and the results of the additional security test sequences; and provide, to a queue for performance on the application and based on the probabilities of the application failing the supplementary security test sequences, one or more of the supplementary security test sequences.

12. The computer program product of claim 11, wherein the non-transitory computer-readable medium comprises code causing the first apparatus to determine a fingerprint of the application.

13. The computer program product of claim 11, wherein the non-transitory computer-readable medium comprises code causing the first apparatus to:

store, in a temporary persistent storage device, the results of the security tests, the results of the initial security test sequences, and the results of the additional security test sequences, wherein each result of the results of the security tests, the results of the initial security test sequences, and the results of the additional security test sequences comprises:

a type of each security test performed on the application to obtain the result;

an order of security tests performed on the application to obtain the result;

whether the application passed or failed; and an index of probability of applications failing each security test performed on the application to obtain the result;

decrease, for each result corresponding to the application passing, the index stored in the temporary persistent storage device; and increase, for each result corresponding to the application failing, the index stored in the temporary persistent storage device.

14. The computer program product of claim 13, wherein the non-transitory computer-readable medium comprises code causing the first apparatus to:

parse the results of the security tests, the results of the initial security test sequences, and the results of the additional security test sequences in the temporary persistent storage device to determine, based on the indices, a subset of the security tests, a subset of the initial security test sequences, and a subset of the additional security test sequences associated with higher probabilities of the application failing; and generate, based on the subset of the security tests, the subset of the initial security test sequences, and the subset of the additional security test sequences, additional supplementary security test sequences by linking security tests and/or security test sequences.

15. The computer program product of claim 14, wherein the temporary persistent storage device is a first temporary persistent storage device, and wherein the non-transitory computer-readable medium comprises code causing the first apparatus to:

determine a fingerprint of the application;

store, in a second temporary persistent storage device, the parsed results of the security tests, the parsed results of the initial security test sequences, and the parsed results of the additional security test sequences in the temporary persistent storage device; and label, in the second temporary persistent storage device and with the fingerprint, the parsed results of the security tests, the parsed results of the initial security test sequences, and the parsed results of the additional security test sequences in the temporary persistent storage device.

16. The computer program product of claim 15, wherein the second temporary persistent storage device comprises other parsed results of security tests and security test sequences performed on one or more other applications, and wherein the other parsed results are labeled with one or more other fingerprints.

17. The computer program product of claim 11, wherein the non-transitory computer-readable medium comprises code causing the first apparatus to:

determine a fingerprint of the application; and store, in a temporary persistent storage device, the results of the security tests, the results of the initial security test sequences, and the results of the additional security test sequences, wherein each of the results of the security tests, the results of the initial security test sequences, and the results of the additional security test sequences is associated with the fingerprint of the application.

18. The computer program product of claim 11, wherein each of the results of the security tests, the results of the initial security test sequences, and the results of the additional security test sequences comprises:

a type of each security test performed on the application to obtain the result;

an order of security tests performed on the application to obtain the result;

whether the application passed or failed; and a fingerprint of the application.

19. A method for dynamically generating linked security tests, the method comprising:

performing security tests on an application;

parsing responses of the application to the security tests to generate results of the security tests, wherein the results of the security tests comprise whether the application passed or failed each of the security tests;

generating, based on the results of the security tests, initial security test sequences, wherein each security test sequence, of the initial security test sequences, comprises a security test, of the security tests, that the application failed followed by another security test of the security tests;

performing the initial security test sequences on the application;

parsing responses of the application to the initial security test sequences to generate results of the initial security test sequences, wherein the results of the initial security test sequences comprise whether the application passed or failed each of the initial security test sequences;

iteratively and until the application passes each security test sequence of additional security test sequences in an iteration:
  generating, based on the results of the initial security test sequences or results of the additional security test sequences, the additional security test sequences, wherein each security test sequence, of the additional security test sequences, comprises a security test sequence that the application failed followed by an additional security test of the security tests;
  performing the additional security test sequences on the application; and
  parsing responses of the application to the additional security test sequences to generate the results of the additional security test sequences, wherein the results of the additional security test sequences comprise whether the application passed or failed each of the additional security test sequences;
providing, to one or more machine learning models, test data to:
  generate supplementary security test sequences; and
  determine probabilities of the application failing the supplementary security test sequences by determining, for each supplementary security test sequence, a probability of the application failing the supplementary security test sequence, wherein the test data comprises:
    information associated with the security tests;
    information associated with the initial security test sequences;
    information associated with the additional security test sequences;
    the results of the security tests;
    the results of the initial security test sequences; and
    the results of the additional security test sequences; and
  providing, to a queue for performance on the application and based on the probabilities of the application failing the supplementary security test sequences, one or more of the supplementary security test sequences.

20. The method of claim 19, wherein the at least one processing device is further configured to determine a fingerprint of the application.

* * * * *